United States Patent
Merchant

(10) Patent No.: US 7,035,971 B1
(45) Date of Patent: Apr. 25, 2006

(54) REQUEST SCHEDULING TO MIRRORED HETEROGENEOUS STORAGE ARRAYS

(75) Inventor: Arif Merchant, Los Altos, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 283 days.

(21) Appl. No.: 10/253,341

(22) Filed: Sep. 23, 2002

(51) Int. Cl.
*G06F 12/00* (2006.01)

(52) U.S. Cl. ...................... 711/114; 711/112
(58) Field of Classification Search ................ 711/112, 711/114
See application file for complete search history.

(56) References Cited

U.S. PATENT DOCUMENTS 6,633,955 B1 * 10/2003 Yin et al. .................... 711/114
6,754,897 B1 * 6/2004 Ofer et al. .................. 718/103

OTHER PUBLICATIONS

Benjamin Kao et al, "Scheduling Soft Real-Time Jobs Over Dual Non-Real-Time Servers", IEEE Transactions on Parallel and Distributed Computing, vol. 7, No. 1, Jan. 1998, pp 56-68.*

Jose Renato Santos et al, "Using Heterogeneous Disks on a Multimedia Storage System with Random Data Allocation", UCLA Computer Science Department Techincal Report #980011, 1998, pp 1-23.*

Guillermo A. Alvarez et al.; Declustering Disk Array Architectures with Optimal and Near-optimal Parallelism; Computer Architecture, 1998. Proceedings. The 25th Annual International Symposium Jun. 27-Jul. 1, 1998, pp. 109-120.*

* cited by examiner

*Primary Examiner*—Pierre M. Vital

(57) ABSTRACT

Method and apparatus for distributing storage requests referencing a replicated data set to heterogeneous storage arrays. A workload includes related storage requests that have a common quality-of-service requirement. The performance levels of the storage arrays are monitored in processing the storage requests. The performance levels and quality-of-service requirements are used for distributing the storage requests between the storage arrays.

30 Claims, 3 Drawing Sheets

REQUEST SCHEDULING TO MIRRORED HETEROGENEOUS STORAGE ARRAYS

FIELD OF THE INVENTION

The present invention generally relates to data storage arrangements, and more particularly to mirrored data storage arrangements.

BACKGROUND

The need for data storage has grown dramatically over the years, and the need has grown especially fast since the advent of public access to and business use of the Internet. Leading the drive for additional storage capacity are applications that use audio, video, and image data. Meeting the storage needs and satisfying the required quality of service of applications are major challenges faced by data centers. Example quality-of-service requirements include an expected response time and a minimum data transfer rate.

For a number of years disk arrays have been widely used for data storage. Disks are capable of storing a large quantity of data, and with configurations such as a RAID and data striping, the data stored in disk arrays are protected against hardware failure and a high rate of data transfer is achievable.

Different applications generate different types of storage access requests and generally access different data. A workload is the term used to refer to a set of related requests observed by a storage arrangement. A particular workload may be generated by one or more applications using the storage arrangement. The requests of a workload may be logically related, for example, requests from similar types of applications, or physically related, for example, requests that reference the same area of storage.

In some storage arrangements optimization is based on maximizing the overall performance of a particular disk array, irrespective of different quality-of-service requirements of the workloads. For example, specific configurations are established for a storage array and data are striped across multiple disks to achieve an overall data transfer rate. Data addressed by a workload that requires a high throughput or low response time may be striped over more disks than data addressed by a workload that requires lower throughput or a greater response time.

This approach, however, does not address the situation in which different workloads have different quality-of-service requirements. Storage arrays do not distinguish between different workloads that address the same data. Thus, all the workloads that address the same data will receive the same quality of service even though the workloads might have different quality of service requirements. Workloads demanding a lower quality of service may receive a quality of service that is better than necessary at the expense of workloads demanding a higher quality of service.

Another drawback is that quality-of-service requirements may change dynamically, and the changes may occur faster than the storage array can be reconfigured to address new requirements. Also, reconfiguration may temporarily degrade performance. Furthermore, the data access patterns of a workload may be unknown or poorly understood. Thus, suitably configuring the storage array prior to operation may not be feasible.

A system and method that address the aforementioned problems, as well as other related problems, are therefore desirable.

SUMMARY OF THE INVENTION

In various embodiments, the invention distributes storage requests that reference a replicated data set to heterogeneous storage arrays. A workload includes related storage requests that have a common quality-of-service requirement. The performance levels of the storage arrays are monitored in processing the storage requests. The performance levels of the storage arrays and quality-of-service requirements are used in distributing the storage requests between the storage arrays.

It will be appreciated that various other embodiments are set forth in the Detailed Description and claims which follow.

BRIEF DESCRIPTION OF THE DRAWINGS

Various aspects and advantages of the invention will become apparent upon review of the following detailed description and upon reference to the drawings in which.

DETAILED DESCRIPTION

The various embodiments of the invention described herein distribute data access requests amongst heterogeneous storage arrays having copies of a replicated data set. The requests are distributed in a manner that considers not only the performance capabilities of the different storage arrays, but also the quality-of-service requirements of different workloads. In another aspect, the distribution is periodically adjusted according to observed performance of the storage arrays in processing requests from the different workloads.

Figure 1:
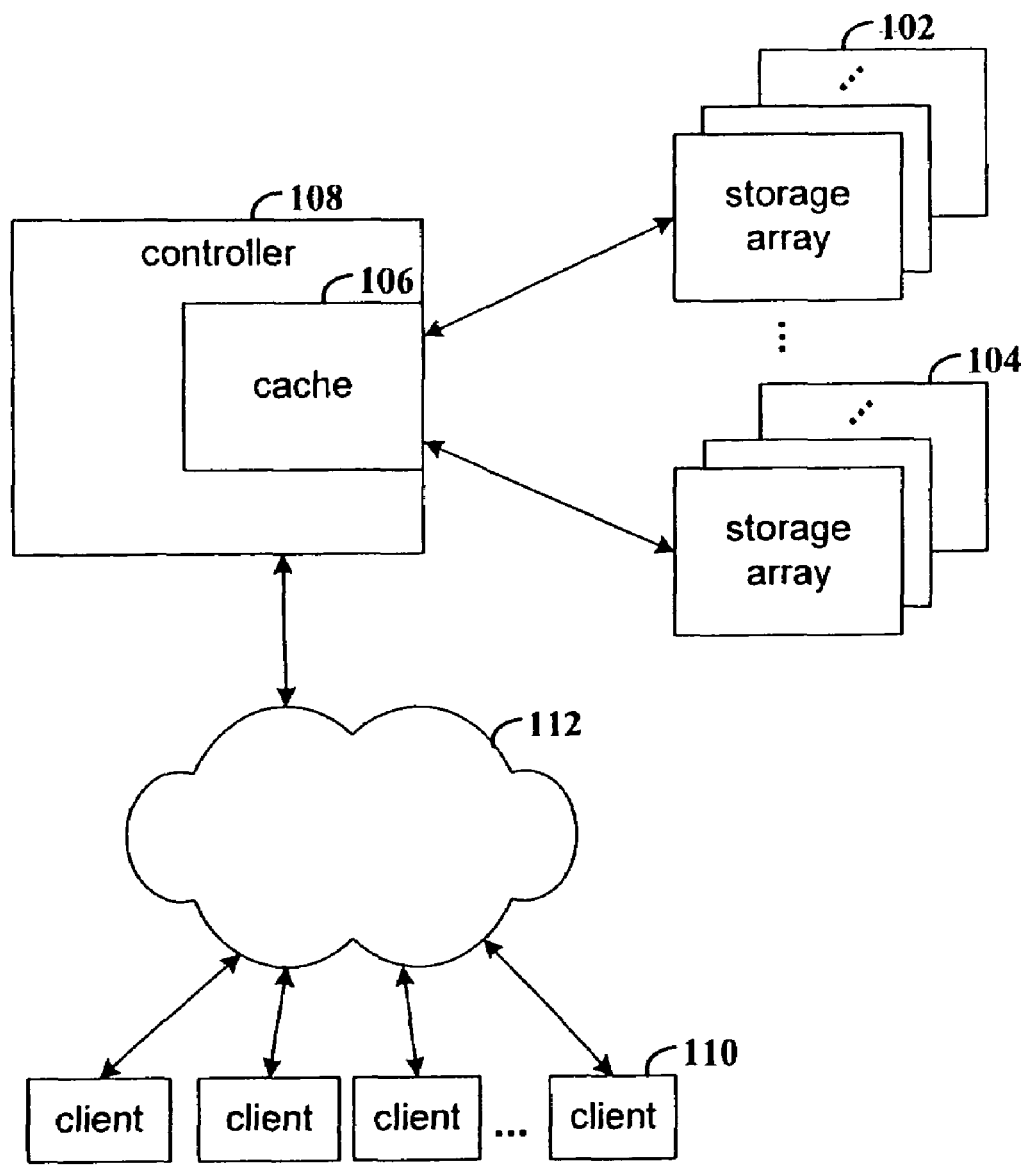
FIG. 1 is a block diagram of a storage arrangement in which access to data is provided for multiple workloads, in accordance with an example embodiment of the invention.

FIG. 1 is a block diagram of a storage arrangement in which access to data is provided for multiple workloads, in accordance with an example embodiment of the invention. The storage arrangement includes multiple storage arrays 102–104, a storage cache 106, and a storage controller 108. Controller 108 provides access to the data in the storage arrays for clients 110, which are coupled to the controller via network 112. Access requests are distributed to the different storage arrays based on the performance capabilities of different storage arrays and the quality-of-service requirements of the different workloads The storage arrays 102–104 are arrays of disks having a replicated a data set. In the example embodiment, the total bandwidth of the arrays is sufficient for the workloads that will access the replicated data set. In addition, the storage arrays are heterogeneous. That is, the physical characteristics or configuration of the arrays are different. For example, one array includes Solid State Disks (SSD) and the other array includes more conventional magnetic disks. Other characteristics that differentiate storage arrays include the data transfer rate and the numbers of disks in the array.

In another embodiment, the replicated data set is stored in more than two storage arrays. For example, the data set is replicated in storage arrays that are distributed over a network. The storage arrays may provide different performance levels relative to the controller 108 because of the different speeds of the intervening network links. Thus, the effective response times of storage arrays depend not only on the speed of the array itself but also on the connection between the array and the controller.

The storage arrangement also includes a cache 106. The cache includes memory for fast access to cached data, along with functionality for managing cache memory and writing updated cached data to the storage arrays. In an example embodiment, the cache 106 is integrated with controller 108, which generally manages network connections between the storage arrangement and the clients 110 generating the workloads. In an example embodiment, the logic of the workload distribution is implemented in the controller. The controller submits access requests to the different storage arrays based on the performance capabilities of different storage arrays and the quality-of-service requirements of the different workloads. In the example embodiment, this is accomplished by adjusting the probability by which requests are distributed to the different storage arrays. An example controller suitable for adaptation for purposes of the present invention is described in the patent/application entitled, "System and Method for Enforcing System Performance Guarantees," by Wilkes, filed on Apr. 10, 2002, having application Ser. No. 10/135,412, the contents of which are incorporated herein by reference.

The clients 110 are coupled to the storage arrangement via network 112. The characteristics of the network will vary according to the application environment. For example, in various embodiments the network is a LAN, a WAN, an intranet, or the Internet. The clients represent applications that generate workloads having different quality-of-service requirements. The clients may be unrelated applications executing on one or more platforms. Alternatively, the clients may be related, but have different quality-of-service requirements.

Figure 2:
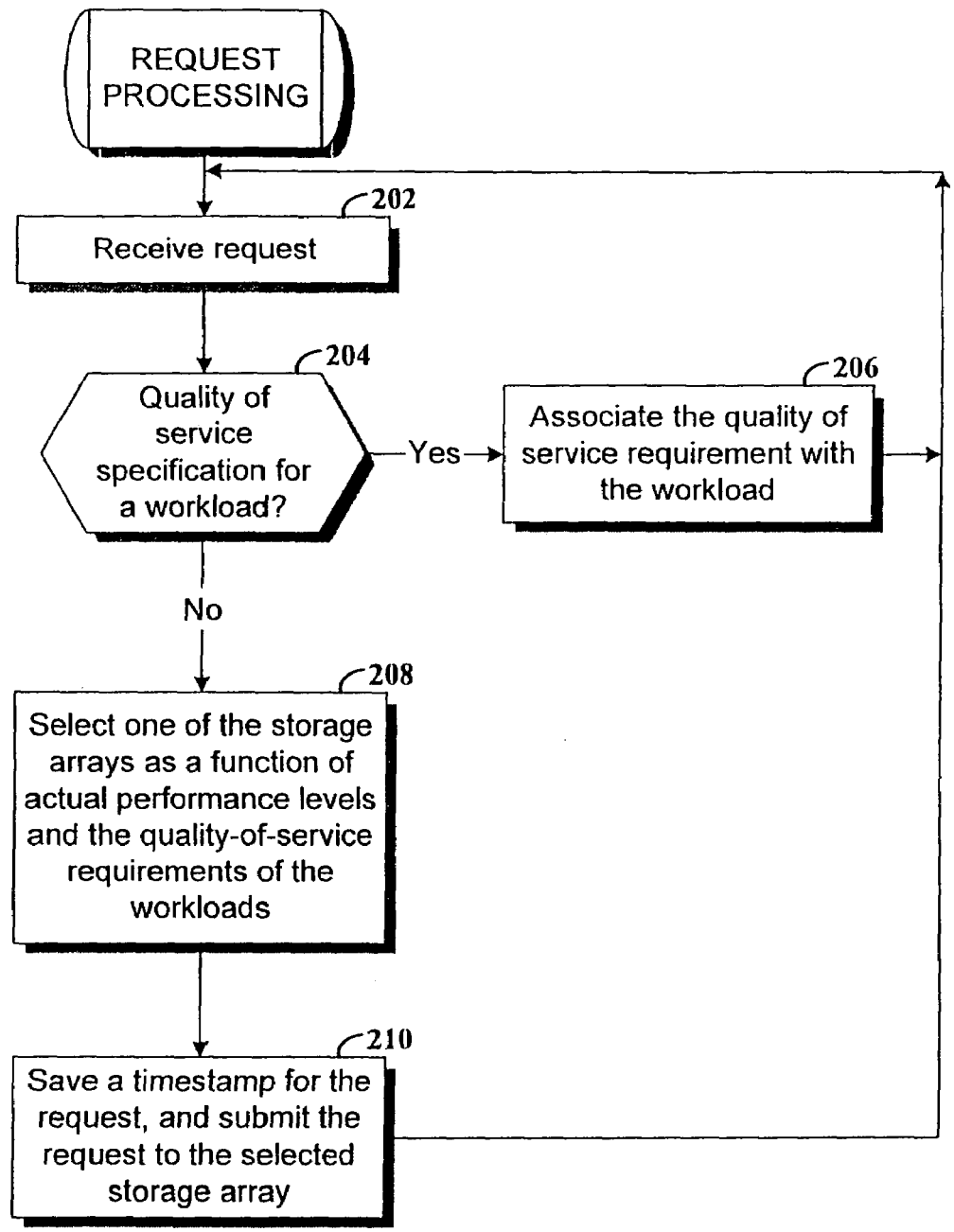
FIG. 2 is a flowchart of an example process for processing a storage access request.
Figure 3:
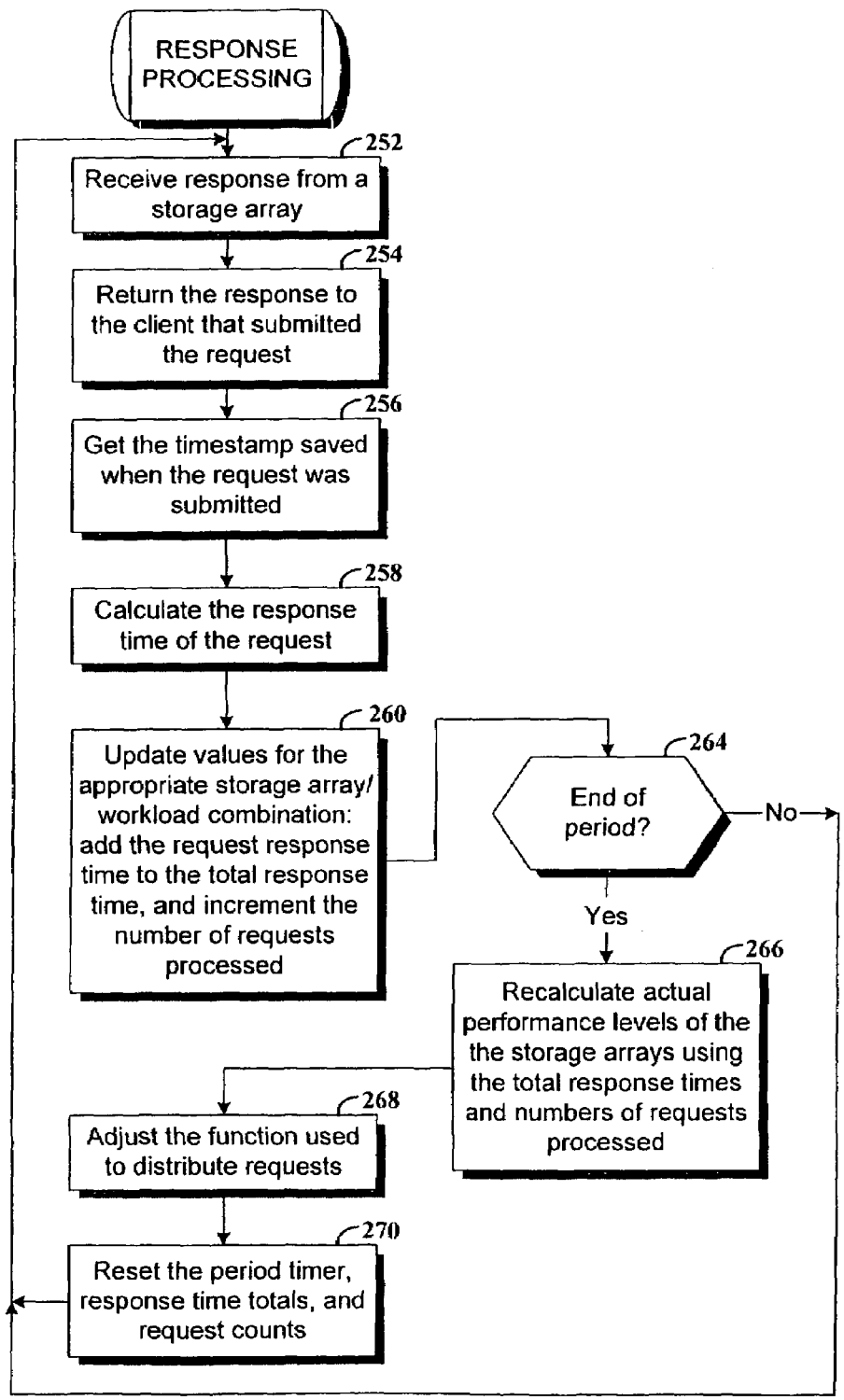
FIG. 3 is a flowchart for processing the response to a storage access request.

Before discussing embodiments of the invention with reference to FIGS. 2 and 3, which illustrate example processes for processing requests and responses, the following discussion presents a higher-level view of one embodiment for distributing the requests to storage arrays having replicated data sets.

In an example embodiment of the invention, the quality-of-service requirement for a workload W is that the average response time for a read request needs to be less than R. The example embodiments of the invention are first described in terms of a replicated data set including two copies, one in a fast storage array and the other in a slower storage array. The example embodiments are then further described in more general terms for a replicated data set including n copies, where n>=2. The discussion of two copies is presented first because a replicated data set may be more commonly implemented with 2 copies versus more than 2 copies.

Each of the storage arrays with the replicated data set has a first-in-first-out (FIFO) queue. For each storage array, the controller distributes the incoming requests from workload W into the FIFO queue as a function of an associated probability; the probabilities associated with the storage arrays may vary as average response times change or quality-of-service requirements change.

The controller estimates actual response times for the faster storage array and slower storage array, Rf and Rs, respectively, for an initial read request within a workload. In various embodiments, the estimated response times may be fixed values for the storage arrays, based on analytical models, or based on response times for previous read requests from another workload sent to these devices. The response times along with the quality-of-service required response time R are used to compute the probability F associated with the faster storage array:

If (Rf>R) then
   F=1;
otherwise, If (Rs<R) then,
   F=1/2
otherwise
   F=(Rs−R)/(Rs−RJ)

As each read request for workload W arrives, the probability of adding the request to the FIFO queue of the faster storage array is F. If the request is not added to the FIFO queue of the faster storage array, the request is added to the FIFO queue of the slower storage array. The slower storage array and the faster storage array each serves requests from its associated queue. However, if the FIFO queue of the faster array is empty, the faster array will serve requests in the FIFO queue of the slower array.

As time passes and the controller processes more requests, the average response times Rf and Rs are periodically adjusted. At the end of each period, Rf and Rs are adjusted and a new probability F is computed based on the new average response times. If the workload submits a change in the quality-of-service response time, the change is reflected in the new probability F, which is computed at the end of the period. In the period following adjustment of the average response times and probability, the new probability value is used to distribute requests between the faster and slower arrays.

The information generated in this manner may also be used for capacity planning purposes. For example, if Rf is larger than R for several periods then it may be that the bandwidth of the faster array is inadequate for the workloads assigned to it. In this scenario, the data storage configuration can be changed to meet the quality-of-service-requirements.

The following paragraphs describe an embodiment of the invention in which the number of copies of a replicated data set is n, where n is >=2. The storage arrays in which the copies of the replicated data set have different data transfer rates. However, the configuration is sufficient for the workloads accessing the replicated data set. As in the case of 2 copies, the controller divides the read requests between the n copies. The average response time of requests in a workload is controlled by changing the probabilities by which requests are distributed to the various copies.

F(1), F(2), . . . , F(n) represent the probabilities that requests from a workload W are sent to the copies 1,2, . . . ,n of the data set, respectively. It will be appreciated that F(1)+F(2)+ . . . +F(n)=1, and each probability is between 0 and 1. As each read request of workload W is received, the controller selects one of the n copies and adds the request to the associated FIFO queue; copy 1 is selected with probability F(1), copy 2 is selected with probability F(2) and so on. The controller also collects the response times of the requests sent to each copy and computes an average response time at the end of the period.

At the beginning of each period (after the first period), the probabilities F(1)–F(n) are adjusted as follows:
1. Identify a "FAST_COPIES" set of copies of the data set having average response times less than or equal to R.
2. Identify the remaining copies as a "SLOW_COPIES" set.
3. Compute Rfast: the average of the response times of FAST_COPIES.
4. Compute Rslow: the average of the response times of SLOW_COPIES.

5. Compute F(1), F(2), ... F(n):
   If |FAST_COPIES| (the number of fast copies) is zero,
      F(k)=1 for the copy with the shortest response time, zero for the others;
   Otherwise, if |SLOW_COPIES| is zero,
      F(k)=1/n for all the copies;
   Otherwise, if copy k is a member of FAST_COPIES,
      F(k)=(Rslow−R)/((Rslow−Rfast)|FAST_COPIES|);
   Otherwise,
      F(k)=(R−Rfast)/((Rslow−Rfast)|SLOW_COPIES|).

For the first period, the controller set the probabilities F(1)–F(n) as explained above for n=2. Also, as in the case of 2 copies, if the queue of one copy is empty, that copy may serve requests from the queue of any copy with a longer measured response time.

FIG. 2 is a flowchart of an example process for processing a storage access request. When the controller receives a request (step 202), it first determines whether the request is a quality of service specification for a workload (decision step 204). If so, the quality of service requirement is associated with the workload (step 206). In one embodiment, the requester identifier specified in a storage access requests is used for identifying a workload. It will be appreciated that, as explained above, there are different types of quality of service requirements and that type of quality-of-service requirement is implementation dependent. In an alternative embodiment, multiple types of quality-of-service requirements are established for each workload, and the controller distributes requests as a function of the multiple quality-of-service requirements.

If the request is for read access to specified data, the process selects a storage array to which to submit the request (step 208). The storage array is selected as a function of the quality-of-service requirements of the workloads and actual performance levels of the storage arrays. An example method for distributing the requests is the probabilistic function described above. In alternative embodiment, a model is used to predict the latency at each array and the fractions of requests sent to each are designed to meet the overall quality-of-service requirement. In another embodiment, the requests are distributed based on the queue lengths at each array, or alternatively, using a feedback-based controller such as a proportional integral-derivative control to adjust the fractions. The actual distribution may be probabilistic based on the fractions, or deterministic (for example, with two arrays and request fractions of ⅓:⅔, the first request out of every three is sent to the first array and the next two are sent to the second array.)

Because write requests are processed by writing to a cache and the cache accumulates write requests before flushing the data to the storage arrays, storage array performance is less an issue in processing write requests than for processing read requests. While write requests must be sent to all arrays, the writing can be performed when the arrays are lightly loaded and also when the cache is nearly full.

In order to track the actual performance level of a storage array, for example, the response time, a timestamp for the request is saved in association with the identity of the selected storage array, and the request is submitted to the selected storage array (step 210). During response processing, the actual performance levels are determined using the saved timestamps. The process then returns to receive and process another request (step 202).

FIG. 3 is a flowchart for processing the response to a storage access request. When the controller receives a response from a storage array (step 252), the requested data are returned to the client that made the request (step 254). The process then proceeds to accumulate information needed for determining the actual performance level of the storage array. The actual performance level in this example embodiment is the response time.

The timestamp that was saved when the request was submitted is retrieved (step 256), and the response time is determined using the saved timestamp and the time at which the response was received (step 258). As explained above, the example embodiment uses an average response time that is calculated over a selected period. For each storage array/workload pair, a total response time and a number of processed requests are accumulated during each period. Thus, a total response time, which is associated with the responding storage array and the workload of the request, is updated by adding the response time of the just-completed request (step 260). In addition, the number of requests processed by the storage array for the workload during the period is incremented.

At the end of each period (step 264), the accumulated information regarding the actual performance levels of the storage arrays and the response times experienced by the workloads is used to adjust the values used to distribute the requests. Specifically, the average response time for each of the storage arrays is computed using the associated number of request processed and the total response time (step 266). The new response levels are then applied to the function used to distribute the requests (step 268), as described above. The period timer is reset along with the response time totals and request counts (step 270) before returning to process another response.

The present invention is believed to be applicable to a variety of arrangements for scheduling storage access requests and has been found to be particularly applicable and beneficial in storage arrays having a replicated data set. Other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. A storage arrangement for processing storage requests that are part of workloads having different quality-of-service requirements, comprising:
   a plurality of storage arrays configured for storage of a replicated data set, wherein at least two of the storage arrays have unequal performance levels for processing storage requests;
   a controller coupled to the storage arrays, the controller configured to monitor actual performance levels provided by the storage arrays in processing storage requests, distribute storage requests between the storage arrays as a function of quality-of-service requirements of the workloads and the performance levels provided by the storage arrays, determine a first performance level for a first storage array of the plurality of storage arrays and a second performance level for a second storage array of the plurality of storage arrays, and responsive to the first performance level being greater than a first quality of service requirement of a first type of workload, distribute all storage requests of the first type of workload to the first storage array, wherein the quality-of-service requirements are bounds on response times, and the performance levels are response times.

2. The storage arrangement of claim 1, wherein the controller is further configured to determine average response times for the actual performance levels.

3. The storage arrangement of claim 2, wherein the controller is further configured to determine the average response times over selected periods.

4. The storage arrangement of claim 1, wherein the controller is further configured to periodically generate respective performance level values for the storage arrays in response to performance levels of the storage arrays during selected periods, and distribute the storage requests between the two or more storage arrays as a function of the quality-of-service requirements of the workloads and the respective performance level values.

5. The storage arrangement of claim 4, wherein the controller is further configured to establish respective fractional shares in association with the storage arrays as a function of the quality-of-service requirements of the workloads and the performance levels of the storage arrays, and distribute the storage requests as a function of the fractional shares.

6. The storage arrangement of claim 5, wherein the controller is further configured to perform a probabilistic distribution of the storage requests between the storage arrays based on the fractional shares.

7. The storage arrangement of claim 5, wherein the controller is further configured to perform a deterministic distribution of the storage requests based on the fractional shares.

8. A method for processing storage requests that are part of workloads having different quality-of-service requirements, comprising:
   associating respective quality-of-service requirements with a plurality of workloads;
   identifying the workload for each storage request;
   monitoring performance levels provided by two or more storage arrays in processing the storage requests, each storage array configured for storage of a replicated data set;
   distributing the storage requests between the two or more storage arrays as a function of the quality-of-service requirements of the workloads and the performance levels provided by the storage arrays, wherein the quality-of-service requirements are bounds on response times, and the performance levels are response times;
   determining a first performance level for a first storage array of the two or more storage arrays and a second performance level for a second storage array of the two or more storage arrays; and
   in response to the first performance level being greater than a first quality-of-service requirement of a first type of workload, distributing all storage requests of the first type of workload to the first storage array.

9. The method of claim 8, further comprising determining average response times for the actual performance levels.

10. The method of claim 9, further comprising repeating the step of determining average response times over selected periods.

11. The method of claim 8, further comprising:
    periodically generating respective performance level values for the storage arrays in response to performance levels of the storage arrays during selected periods; and
    distributing the storage requests between the two or more storage arrays as a function of the quality-of-service requirements of the workloads and the respective performance level values.

12. The method of claim 11, further comprising
    establishing respective fractional shares in association with the storage arrays as a function of the quality-of-service requirements of the workloads and the performance levels of the storage arrays;
    distributing the storage requests as a function of the fractional shares.

13. The method of claim 12, further comprising performing a probabilistic distribution of the storage requests between the storage arrays based on the fractional shares.

14. The method of claim 12, further comprising performing a deterministic distribution of the storage requests based on the fractional shares.

15. The method of claim 8, further comprising:
    establishing respective fractional shares in association with the storage arrays as a function of the quality-of-service requirements of the workloads and the performance levels of the storage arrays;
    distributing the storage requests between the storage arrays as a function of the fractional shares.

16. The method of claim 15, further comprising performing a probabilistic distribution of the storage requests based on the fractional shares.

17. The method of claim 15, further comprising performing a deterministic distribution of the storage requests based on the fractional shares.

18. An article of manufacture, comprising:
    a computer-readable medium configured with instructions for causing a computer to process storage requests that are part of workloads having different quality-of-service requirements by performing the steps of,
        associating respective quality-of-service requirements with a plurality of workloads;
        identifying the workload for each storage request;
        monitoring performance levels provided by two or more storage arrays in processing the storage requests, each storage array configured for storage of a replicated data set;
        distributing the storage requests between the two or more storage arrays as a function of the quality-of-service requirements of the workloads and the performance levels provided by the storage arrays;
        determining a first performance level for a first storage array of the two or more storage arrays and a second performance level for a second storage array of the two or more storage arrays; and
        in response to the first performance level being greater than a first quality-of-service requirement of a first type of workload, distributing all storage requests of the first type of workload to the first storage array.

19. An apparatus for processing storage requests that are part of workloads having different quality-of-service requirements, comprising:
    means for associating respective quality-of-service requirements with a plurality of workloads;
    means for identifying the workload for each storage request;
    means for monitoring performance levels provided by two or more storage arrays in processing the storage requests, each storage array configured for storage of a replicated data set;
    means for distributing the storage requests between the two or more storage arrays as a function of the qualityof-service requirements of the workloads and the performance levels provided by the storage arrays;

means for determining a first performance level for a first storage array of the two or more storage arrays and a second performance level for a second storage array of the two or more storage arrays; and means, responsive to the first performance level being greater than a first quality-of-service requirement of a first type of workload, for distributing all storage requests of the first type of workload to the first storage array.

20. A method for processing storage access requests, comprising:

associating respective response time requirements with a plurality of types of workloads, wherein each storage request is of a type of one of the workloads;

identifying the workload type of each storage request received via a network at an access controller;

monitoring respective response times by two or more storage arrays in processing the storage requests, each storage array configured for storage of a replicated data set;

distributing the storage requests between the two or more storage arrays as a function of the response time requirements of the types of workloads and the respective response times provided by the storage arrays;

determining a first response time for a first storage array of the two or more storage arrays and a second response time for a second storage array of the two or more storage arrays; and in response to the first response time being greater than a first response time requirement of a first type of workload, distributing all storage requests of the first type of workload to the first storage array.

21. The method of claim 20, further comprising in response to the first response time being less than or equal to the first response time requirement of a first type of workload and the second response time being less than the first response time requirement of the first type of workload, distributing one half of the storage requests of the first type of workload to the first storage array, and one half of the storage requests of the first type of workload to the second storage array.

22. The method of claim 21, further comprising in response to the first response time being less than or equal to the first response time requirement of a first type of workload and the second response time being greater than or equal to the first response time requirement of the first type of workload, distributing the storage requests of the first type of workload to the first storage array in proportion to (Rs−R)/(Rs−Rf), wherein Rs is the second response time, Rf is the first response time, and R is the first response time requirement.

23. The method of claim 22, further comprising periodically adjusting the first and second response times in response to monitoring of the respective response times.

24. The method of claim 23, wherein the first and second response times are averages of the monitored respective response times.

25. A storage arrangement for processing storage requests, comprising:

at least two storage arrays adapted to process storage requests, wherein each storage request is of a type of workload and each type of workload has an associated response time requirement, each storage array configured for storage of a replicated data set, and at least two of the storage arrays provide unequal response times for processing storage requests;

a controller coupled to the storage arrays, the controller adapted to receive the storage requests from a network and configured to monitor actual response times provided by the storage arrays in processing storage requests, and distribute storage requests between the storage arrays as a function of the respective response time requirements of the types of workloads and the respective response times provided by the storage arrays, wherein the controller is further configured to determine a first response time for a first storage array and a second response time for a second storage array, and responsive to the first response time being greater than a first response time requirement of a first type of workload, distribute all storage requests of the first type of workload to the first storage array.

26. The storage arrangement of claim 25, wherein the controller is further configured to, responsive to the first response time being less than or equal to the first response time requirement of a first type of workload and the second response time being less than the first response time requirement of the first type of workload, distribute one half of the storage requests of the first type of workload to the first storage array, and one half of the storage requests of the first type of workload to the second storage array.

27. The storage arrangement of claim 26, wherein the controller is further configured to, responsive to the first response time being less than or equal to the first response time requirement of a first type of workload and the second response time being greater than or equal to the first response time requirement of the first type of workload, distribute the storage requests of the first type of workload to the first storage array in proportion to (Rs−R)/(Rs−Rf), wherein Rs is the second response time, Rf is the first response time, and R is the first response time requirement.

28. The storage arrangement of claim 27, wherein the controller is further configured to periodically adjust the first and second response times in response to monitored response times.

29. The storage arrangement of claim 28, wherein the first and second response times are averages of the monitored respective response times.

30. An apparatus for processing storage access requests, comprising:

means for associating respective response time requirements with a plurality of types of workloads, wherein each storage request is of a type of one of the workloads;

means for identifying the workload type of each storage request received via a network at an access controller;

means for monitoring respective response times by two or more storage arrays in processing the storage requests, each storage array configured for storage of a replicated data set;

means for distributing the storage requests between the two or more storage arrays as a function of the response time requirements of the types of workloads and the respective response times provided by the storage arrays;

means for determining a first response time for a first storage array of the two or more storage arrays and a second response time for a second storage array of the two or more storage arrays; and means, responsive to the first response time being greater than a first response time requirement of a first type of workload, for distributing all storage requests of the first type of workload to the first storage array.

* * * * *

UNITED STATES PATENT AND TRADEMARK OFFICE
CERTIFICATE OF CORRECTION

| | | |
|---|---|---|
| PATENT NO. | : 7,035,971 B1 | Page 1 of 1 |
| APPLICATION NO. | : 10/253341 | |
| DATED | : April 25, 2006 | |
| INVENTOR(S) | : Arif Merchant | |

It is certified that error appears in the above-identified patent and that said Letters Patent is hereby corrected as shown below:

In column 4, line 9, delete "F=(Rs-R)/(Rs-RJ)" and insert -- F=(Rs-R)/(Rs-Rf) --, therefor.

In column 8, line 5, in Claim 12, after "comprising" insert -- : --.

Signed and Sealed this

Thirtieth Day of March, 2010

David J. Kappos
*Director of the United States Patent and Trademark Office*